United States Patent
Hoang et al.

(10) Patent No.: US 9,624,129 B2
(45) Date of Patent: *Apr. 18, 2017

(54) INERTING PROCESS FOR IMPURITIES

(75) Inventors: Lê-Chiên Hoang, Ruy-Montceau (FR); Serge Ghilardi, Mery (FR)

(73) Assignee: LAFARGE, Paris (FR)

( * ) Notice: Subject to any disclaimer, the term of this patent is extended or adjusted under 35 U.S.C. 154(b) by 1129 days.

This patent is subject to a terminal disclaimer.

(21) Appl. No.: 13/501,774

(22) PCT Filed: Oct. 12, 2010

(86) PCT No.: PCT/FR2010/052160
§ 371 (c)(1),
(2), (4) Date: May 21, 2012

(87) PCT Pub. No.: WO2011/045528
PCT Pub. Date: Apr. 21, 2011

(65) Prior Publication Data
US 2012/0216723 A1    Aug. 30, 2012

(30) Foreign Application Priority Data
Oct. 14, 2009 (FR) ..................... 09 04923

(51) Int. Cl.
C04B 16/04 (2006.01)
C04B 16/08 (2006.01)
C04B 20/02 (2006.01)
C04B 24/26 (2006.01)
C04B 24/38 (2006.01)
C04B 28/02 (2006.01)

(52) U.S. Cl.
CPC ........ C04B 20/023 (2013.01); C04B 24/2652 (2013.01); C04B 24/38 (2013.01); C04B 28/02 (2013.01)

(58) Field of Classification Search
CPC ................. C04B 16/04; C04B 16/08
See application file for complete search history.

(56) References Cited

U.S. PATENT DOCUMENTS

| | | | | |
|---|---|---|---|---|
| 5,366,550 A | * | 11/1994 | Schad | C04B 28/02 106/691 |
| 5,731,259 A | * | 3/1998 | Palumbo et al. | 502/404 |
| 8,257,490 B2 | * | 9/2012 | Alain et al. | 106/802 |
| 8,425,680 B2 | * | 4/2013 | Jacquet et al. | 106/802 |
| 8,466,224 B2 | * | 6/2013 | Georges et al. | 524/445 |
| 8,834,626 B2 | * | 9/2014 | Jacquet et al. | 106/802 |
| 2013/0035417 A1 | * | 2/2013 | Villard et al. | 523/401 |

FOREIGN PATENT DOCUMENTS

| | | |
|---|---|---|
| EP | 0 471 597 B1 | 2/1992 |
| EP | 2 090 620 A1 | 8/2008 |
| FR | 2 875 496 A1 | 3/2006 |
| GB | 508 929 A | 7/1939 |
| JP | 2006-045010 | 2/2006 |
| WO | WO 2006/032785 | 3/2006 |
| WO | WO 2006/032786 A2 | 3/2006 |
| WO | WO 2009/052362 A2 | 4/2009 |
| WO | WO 2010/005117 | 1/2010 |
| WO | WO 2010/040915 A2 | 4/2010 |

OTHER PUBLICATIONS

"What do we Mean by Building Technology?" Habitat International vol. 15, No. 1/2 pp. 3-26 (1991), Ranko Bon.*
International Search Report for PCT/FR2010/052160.

* cited by examiner

*Primary Examiner* — Paul Marcantoni
(74) *Attorney, Agent, or Firm* — Pillsbury Winthrop Shaw Pittman LLP

(57) ABSTRACT

An inerting process for impurities in aggregates intended for preparation of hydraulic or hydrocarbon compositions, includes adding to the composition or to one of its constituents a cationic polymer corresponding to at least one derivative of a natural polymer or a polymer of natural origin selected from the group including dextrin (in particular yellow dextrin and white dextrin), chitosan, chitin, alginates, hemicellulose, pectin, polyols or proteins.

22 Claims, No Drawings

INERTING PROCESS FOR IMPURITIES

CROSS REFERENCE TO RELATED APPLICATIONS

This application is the U.S. National Stage of PCT/FR2010/052160, filed Oct. 12, 2010, which in turn claims priority to French Patent Application No. 09/04923, filed Oct. 14, 2009, the entire contents of all applications are incorporated herein by reference in their entireties.

The present invention relates to an inerting process for harmful impurities such as clays of aggregates in cement hydraulic compositions or bituminous hydrocarbon compositions.

It is sometimes difficult to control in a constant manner the rheological properties of cement hydraulic compositions or adhesion properties between a hydrocarbon binder and the aggregates of hydrocarbon compositions. The quality of the raw materials is often responsible for these variations. In particular, it has been found that sands or more particularly the impurities contained in sands, for example clays, can generate fluctuations of the rheological properties of hydraulic compositions or the adhesion properties between a hydrocarbon binder and the aggregates of hydrocarbon compositions.

For hydraulic compositions, these fluctuations may be due to a decrease of the efficiency of superplasticizers of the anionic polymer type having a comb structure, for example the polyoxyalkylene polycarboxylate (PCP).

During the production of aggregates, in particular sands, a known means of eliminating clays and other impurities of the aggregates is by washing in water. The dirty water is then treated by a flocculation agent which makes it possible to accelerate the liquid-solid separation and hence recover clean water. This water is then recycled to wash sand again. However, this solution is expensive in terms of equipment and requires a considerable supply of water.

Another solution consists of not separating the clays from the sands but inerting the clays in the sands. Patent Application WO2006032785 provides the use of absorption agents modifying the activity of the clay, for example by reducing its absorption capacity or by carrying out a pre-absorption process. This document WO2006032785 describes in particular the use of cationic polymers comprising groups of quaternary amines. Nevertheless, the use of products used in the described examples in this document can lead to the addition of a significant amount of chlorine into the hydraulic composition. This is not desirable inasmuch as standards generally impose a maximum quantity of chlorine in the hydraulic compositions (the NF EN 206-1 Standard specifies a maximum quantity of 1% of chloride ions Cl⁻ relative to the cement for non-reinforced concretes and a maximum quantity of 0.1% of chloride ions Cl⁻ relative to the cement for metal-reinforced concretes) or hydrocarbon compositions due to the corrosive property of chlorine.

The aim of the present invention is therefore to provide a process for the preparation of hydraulic or hydrocarbon compositions which are useful to reduce the undesirable effects related to the presence of such harmful impurities as clays and which makes it possible to reduce the introduction of chlorine into the hydraulic or hydrocarbon composition.

This aim is reached by using specific cationic polymers. Therefore, the invention relates to an inerting process for impurities, for example clays, in aggregates intended for the preparation of hydraulic or hydrocarbon compositions, comprising a step consisting of adding to the composition or to one of its constituents a cationic polymer corresponding to at least one derivative of a natural polymer or a polymer of natural origin selected from the group comprising dextrin (in particular, yellow dextrin and white dextrin), chitosan, chitin, alginates, hemicellulose, pectin, polyols or proteins.

Advantageously, at least certain cationic polymers according to the invention may be obtained from products widely available in nature.

The invention offers another advantage in that the cationic polymer, according to the invention, is soluble in water, which facilitates its use.

The invention offers another advantage in that the inerting efficiency of the cationic polymer, according to the invention, is not very sensitive to the nature of the clay.

Another advantage of the present invention is that the cationic polymer according to the invention does not induce an increase of the viscosity of the hydraulic or hydrocarbon composition.

Another advantage of the present invention is that the dosage of the cationic polymer according to the invention in the hydraulic or hydrocarbon composition is reduced.

Finally, the invention has the advantage of being able to be used in the construction industry, the chemical industry (admixture suppliers), the cement industry, in construction markets (buildings, civil engineering, roads or pre-cast plants) or in concrete mixing plants.

Other advantages and characteristics of the invention will clearly appear after reading the following description and examples provided purely for illustrative and non-limiting purposes.

In the present description, the term <<polymer>> is to be understood as a compound comprising more than two identical or different, linear and/or branched monomeric units presenting a particular or not particular order.

The term <<cationicity>> is to be understood as denoting the density of positive charges carried by a compound.

The expression <<degree of substitution (DS)>> is to be understood according to the invention as the average number of moles of the quaternary group carrying one or more cationic functions (for example quaternary nitrogen) linked to a unit of, for example, glucose and/or of glucosamine. The value of the DS may vary from 0 to 3.

The expression <<degree of polymerisation (DP)>> is to be understood according to the invention as the number of constitutive units (repetition units) of the polymer. Generally, a polymer comprises several macromolecules which can have different degrees of polymerisation. The expression <<average degree of polymerisation (ADP)>> is to be understood according to the invention as the ratio between the total number of constitutive units (repetition units) and the total number of macromolecules.

The term <<hydraulic composition>> is to be understood as any composition capable of hydraulic setting, and most particularly the mortars and concretes intended for all the construction markets (buildings, civil engineering or pre-cast plants).

The expression <<hydraulic binder>> is to be understood according to the present invention as a pulverulent material which, mixed with water, forms a paste which sets and hardens as a result of hydration reactions, and which, after hardening, retains its strength and its stability, even under water.

The term <<concrete>>, is to be understood as a mix of hydraulic binders (for example cement), aggregates, water, optionally additives, and optionally mineral additions, for example high performance concrete, very high performance concrete, self-placing concrete, self-levelling concrete, selfcompacting concrete, fibre concrete, ready-mix concrete or coloured concrete. The term <<concrete>>, is also to be understood as concretes having been submitted to a finishing operation, for example bush-hammered concrete, exposed or washed concrete or polished concrete. Pre-stressed concrete is also to be understood by this definition. The term <<concrete>> comprises mortars. In this specific case the concrete comprises a mix of hydraulic binder, sand, water and optionally additives and optionally mineral additions. The term <<concrete>> according to the invention denotes either fresh concrete or hardened concrete.

The expression <<hydrocarbon composition>> is to be understood according to the present invention as a composition comprising at least one hydrocarbon binder and aggregates, for example asphaltic concrete, road-base asphalt, asphalt, or superficial coatings with a base of an emulsion of bitumen. A hydrocarbon composition according to the invention may further comprise typical additives, for example adhesion agents or fibres (of glass, cellulose or asbestos for example). A hydrocarbon composition according to the invention may further comprise recycled materials, for example roof shingles, glass or concrete.

The expression <<hydrocarbon binder>> is to be understood according to the present invention as a substance composed of a mix of very viscous hydrocarbon compounds, or even solid at ambient temperature. A hydrocarbon binder according to the invention may for example be natural bitumen or crude bitumen derived from petroleum (pure bitumens NF EN 12591 Standard, Special bitumens with the <<hard>> grade NF EN 13924 Standard, etc.).

The term <<aggregates>> according to the invention is to be understood as gravel, coarse gravel and/or sand.

The term <<sand>>, is to be understood as aggregates having an average particle size from 0 to 6 mm, preferably from 0 to 4 mm. They may be of any calcareous, siliceous or silica-calcareous or other mineral nature. This definition also comprises fillers or other inorganic particulate materials which could be present in the hydraulic compositions.

The term <<impurities>>, is to be understood as impurities capable of degrading the properties of hydraulic or hydrocarbon compositions, in particular the rheological properties of hydraulic compositions or the adhesion properties between a hydrocarbon binder and the aggregates of hydrocarbon compositions. They may be compounds having a high absorption capacity of organic molecules. They may be clays present at the aggregates level. They may also be fines, mineral additions, etc.

The term <<clay>>, is to be understood as aluminium silicates and/or magnesium silicates, in particular phyllosilicates with a layer structure, typically spaced by approximately 7 to approximately 14 Angstroms. This term nevertheless also comprises other types of clays, in particular amorphous clays, swelling clays or non-swelling clays. Among the clays frequently found in sands the montmorillonite, illite, kaolinite, muscovite and chlorite clays can in particular be mentioned.

The invention relates to an inerting process for impurities in hydraulic or hydrocarbon compositions, comprising a step of adding to the composition or to one of its constituents, a cationic polymer corresponding to at least one derivative of a natural polymer or a polymer of natural origin selected from the group comprising dextrin, chitosan, chitin, alginates, hemicellulose, pectin, polyols or proteins.

The inventors have shown that several parameters should be taken into account to obtain a cationic polymer corresponding to at least one derivative of a natural polymer or a polymer of natural origin and adapted to inert impurities in hydraulic or hydrocarbon compositions. Among the parameters found by the inventors there is the molecular weight or the molar mass of the cationic polymer, the density of cationic charges of the cationic polymer and the branching of the cationic polymer.

Advantageously, the average number of cationic charges per repetition unit is greater than 0.1, preferably greater than 0.5, more preferably greater than 0.7.

Advantageously, the cationic polymer according to the invention has an average degree of polymerisation of from 4 to 3,000, in particular from 10 to 2,000, preferably from 50 to 500.

Advantageously, the cationic polymer according to the invention has a molar mass less than 500,000 g/mol, preferably less than 100,000 g/mol.

Advantageously, the cationic polymer according to the invention has a linear or branched structure.

Furthermore, the inventors have shown that, advantageously, with a cationic polymer corresponding to at least one derivative of a natural polymer or to a polymer of natural origin selected from the group comprising dextrin, chitosan, chitin, alginates, hemicellulose, pectin, polyols or proteins, the use of the polymer is facilitated inasmuch as the cationic polymer is soluble in water. Preferably, the cationic polymer has a solubility rate greater than 70% in water at 20° C.

The inventors have shown that efficient inerting of the impurities is not obtained with all the derivatives of a natural polymer or a polymer of natural origin. In particular, the inventors have shown that efficient inerting of the impurities is not obtained using a cationic polymer corresponding to cationic starch. It is indeed not possible to produce cationic starch with a sufficient quantity of charges to inert the impurities of hydraulic or hydrocarbon compositions. Furthermore, starch is not soluble in water at 25° C. Furthermore, the addition of starch to a hydraulic or hydrocarbon composition induces an increase of the viscosity of the hydraulic or hydrocarbon composition, which is generally not desired.

Dextrin, chitosan, chitin, alginates, and hemicellulose are polysaccharides. Polysaccharides are polymers formed of several oses (or monosaccharides) having the general formula $—[C_x(H_2O)_y)]_n—$ where x is greater than or equal to 4, y is generally equal to x−1 and n is greater than or equal to 2. There are two categories of polysaccharides: the homopolysaccharides constituted of the same monosaccharide and the heteropolysaccharides formed of different monosaccharides.

Starch is a polysaccharide corresponding to a mix of two homopolymers, amylose and amylopectin, which are composed of D-Anhydroglucopyranose units (or AGU, Anhydroglucose Unit). The AGUs are linked together by $\alpha$ (1-4) bonds and $\alpha$ (1-6) bonds, the latter being at the origin of the branching in the structure of the molecule. These two homopolymers differ by their branching degree and their degree of polymerisation. Amylose is a linear polysaccharide and represents 17 to 30% of the mix in ordinary starches, more than 50% of the mix in particular starches and less than 1% in wax starches. The molar mass of amylose is generally from 40,000 to 500,000 g/mol, or even more. The average degree of polymerisation of amylose is from 300 to 3000, or even more. Amylopectin is a branched polysaccharide with short branches every 11 to 30 AGUs by the intermediary of $\alpha$ (1-6) bonds. Amylopectin represents 70 to 80% of the mix in ordinary starches, less than 50% for the particular starches and more than 99% for the wax starches. Its molar mass can go from 1,000,000 to 100,000,000 g/mol and its branching level is of the order of 5%. The average degree of polymerisation of amylopectin is from 10,000 to 100,000.

Dextrins are obtained by desiccation or acid hydrolysis of starch. The thermal treatment leads to partial hydrolysis of the α(1-4) glycosidic bonds in the initial reaction time followed by a restructuring of the molecules due to the appearance of new α(1-4), α(1-6), β(1-2), β(1-6) glycosidic bonds resulting in that the D-Anhydroglucopyranose (AGU) units can be linked together by other types of bonds than the α (1-4) and α (1-6) bonds. Dextrins may be obtained by chemical or enzymatic processes. They therefore correspond to a mix of branched polymers composed of D-Anhydroglucopyranose (AGU) units. The molar mass of dextrin is generally less than 500,000 g/mol. The average degree of polymerisation of dextrin is from 4 to 3000.

Chitosan is a polysaccharide composed of the random distribution of D-glucosamine (deacetylated unit) and of N-acetyl-D-glucosamine (acetylated unit) linked by β-(1-4) bonds. It may be produced by chemical deacetylation (in an alkaline medium) or enzymatic deacetylation of the chitin.

Advantageously, the cationic polymer according to the invention is a cationic polysaccharide, preferably a branched cationic polysaccharide.

According to an example of an embodiment of the invention, the average number of cationic charges per unit of glucose of the cationic polysaccharide is greater than 0.1, preferably greater than 0.5, more preferably greater than 0.7.

Advantageously, the cationic polymer according to the invention is a cationic polysaccharide having an average degree of polymerisation of from 4 to 3,000, in particular from 10 to 2,000, preferably from 30 to 300.

Advantageously, the cationic polymer according to the invention is a cationic polysaccharide having a molar mass less than 500,000 g/mol, in particular less than 100,000 g/mol, preferably less than 50,000 g/mol.

Advantageously, the cationic polysaccharide according to the invention has a linear or branched structure, preferably branched with α(1-3), α(1-4), α(1-6), β(1-2), β(1-6), etc. bonds between the units of glucose.

Advantageously, the cationic polysaccharides considered in the present invention are derived from natural polysaccharides. Natural polysaccharides are, advantageously, biodegradable, biocompatible and are abundant in nature.

Advantageously, the cationic polymer according to the invention is a dextrin. Among dextrins, there are in particular white dextrins and yellow dextrins which are distinguished by the range of viscosity, their solubility in cold water, the colour and the content of sugar reducer. Yellow dextrins generally have a lower molar mass than white dextrins.

Advantageously, the dextrin according to the invention has a solubility rate in water at 20° C. greater than 70%, preferably greater than 90%, more preferably greater than 95%.

Advantageously, the dextrin according to the invention has a content of reducing sugars less than 20° A), preferably less than 10%, more preferably less than 5% (the content of reducing sugars can be measured according to the Fehling method).

The molar mass of the yellow dextrin is from 500 g/mol to 50,000 g/mol. The average degree of polymerisation of the yellow dextrin is from 3 to 300. The insolubility rate is less than 10%, preferably less than 5%. The content of sugar reducer of the yellow dextrin is from 2 to 6%.

The molar mass of the white dextrin is from 50,000 g/mol to 500,000 g/mol. The average degree of polymerisation of the white dextrin is from 300 to 3,000. The content of reducing sugar of the white dextrin is from 4 to 10%.

The yellow and white dextrins are prepared by dextrinisation (also called dextrinification) of starches. This transformation comprises a hydrolysis step and a re-association step (condensation and transglucosidation) by forming new bonds between the units of glucose. The yellow dextrins may be prepared by heating the starch to temperatures from 135 to 180° C. for 8 to 14 hours in the presence of an acid as a catalyst. The white dextrins may be prepared by heating the starch to temperatures from 120 à 130° C. for 3 to 7 hours in the presence of an acid catalyst. Advantageously, the cationic polymer according to the invention is a yellow dextrin.

Preferably, the cationic polymers are obtained by post-synthetic modification of the natural polymer or of the polymer of natural origin, for example by grafting groups carrying one or more cationic functions onto the natural polymer or the polymer of natural origin carrying suitable reactive groups.

Preferably, the grafting operation may comprise:
etherification reactions;
esterification reactions;
quaternisation reactions; and/or
re-dox reactions and/or amination-reduction reactions.

Preferably, the cationic polymers are obtained by post-synthetic modification of a polysaccharide, for example by grafting groups carrying one or more cationic functions onto a polymer chain carrying suitable reactant groups. Advantageously, the cationic polysaccharide according to the invention has a degree of substitution of from 0.05 to 3, preferably from 0.2 to 2.5, more preferably from 0.5 to 1.5, in particular greater than 0.6, in particular greater than 0.7.

Preferably, the grafting operation comprises etherification or esterification reactions. In this case, the groups carrying one or more cationic functions may, in particular, be phosphonium, pyridinium, sulfonium and quaternary amine groups. Preferably, the groups carrying one or more cationic functions are quaternary amine groups. Preferably, the cationic polymer is a polysaccharide substituted by quaternary amine groups The reaction of the natural polymer or polymer of natural origin with the quaternary amine compound is generally carried out in the presence of a base and, preferably, in an aqueous medium. Nevertheless, other protic or aprotic solvents, for example alcohols, preferably ethanol, propanol or isopropanol, or amides such as dimethylformamide (DMF), may also be used alone or in a mixture with water.

The cationic polysaccharides comprising cationic quaternary amine groups are particularly suitable.

According to an example of the process of production of the cationic polymer, a polysaccharide is left to react with a quaternary amine compound comprising at least one group adapted to react with the hydroxyl groups or amines of the polysaccharide to provide a polysaccharide with a degree of substitution of at least 0.05.

The grafting reaction with the cationic quaternary amine compound may be carried out in one step or in two steps or in a greater number of steps with or without intermediary separation and purification steps of the product. In each step the reaction is carried out by contacting the polysaccharide with the base, preferably in an aqueous medium.

The reaction temperature for each step may be from 15 to 120° C., preferably from 20 to 100° C. for at least certain steps, and the total duration of the complete reaction may be, for example from 1 to 48 hours.

According to an example of an embodiment of the invention, in the case where the grafting operation of the quaternary amine groups on the natural polymer or polymer of natural origin comprises etherification reactions, the quaternary amine groups may be derived from a quaternary amine compound according to formula (1) or (2):

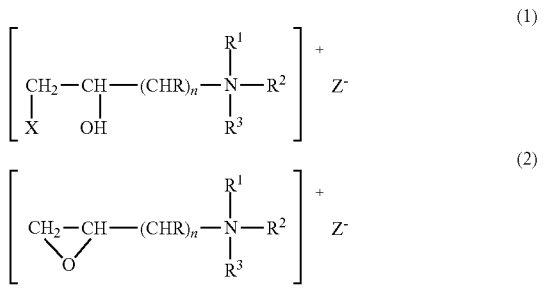

wherein n is an integer from 1 to 16;

X is a halogen, in particular fluorine, chlorine, bromine or iodine, preferably chlorine;

Z is an inorganic anion, for example a halide (fluorine, chlorine, bromine or iodine, preferably chlorine), a nitrate, a nitrite, a phosphate, a sulphate or a hydroxide, or an organic anion, for example a carboxylate such as an acetate or a propionate, the anion being preferably non-halogenated.

R, $R^1$, $R^2$ and $R^3$, which may be identical or different, are each hydrogen or an organic radical, $R^2$ furthermore capable of being a group according to formulae (3) or (4):

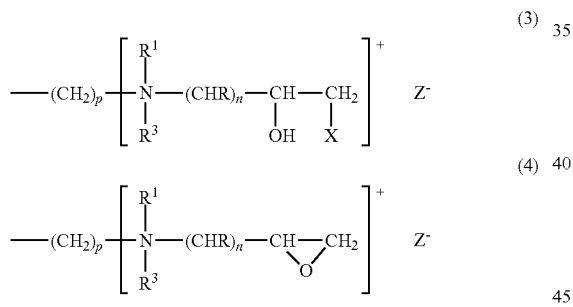

wherein p is an integer from 2 to 10 and n, R, $R^1$, $R^2$, $R^3$, X and Z are as previously defined.

Preferably, R, $R^1$, $R^2$ and $R^3$ are each hydrogen. When one of these groups is an organic radical, R, $R^1$, $R^2$ and $R^3$ are each advantageously an alkyl, hydroxyalkyl, alkenyl or aryl group. Sizeable organic groups increase the molecular weight of the product, therefore smaller groups are preferred. Preferably, R, $R^1$, $R^2$ and $R^3$ are each hydrogen or an alkyl, hydroxyalkyl, alkenyl or aryl group comprising up to 10 carbon atoms. Advantageously, the organic group is methyl or hydroxymethyl.

According to an example of an embodiment, the quaternary amine compound is selected from the group comprising:

2,3-epoxypropyl-N,N,N-trimethylammonium chloride (commercialised by Degussa A.G. in the form of an aqueous solution at 70% under the name QUAB 151 or commercialised by Fluka in the form of a solid compound under the product code 50045);

3-chloro-2-hydroxypropyl-N,N,N-trimethylammonium chloride (commercialised by Degussa A.G. in the form of an aqueous solution at 65% under the name QUAB 188 or commercialised by Dow Chemical Company in the form of an aqueous solution at 65% under the name QUAT 188);

3-chloro-2-hydroxypropyl-N,N-dimethylammonium chloride (commercialised by Degussa A. G. in the form of an aqueous solution at 65% under the name QUAB 218); and 1,3-bis-(3-chloro-2-hydroxypropyl-N,N-dimethylammonium) N-propane dichlorohydrin (commercialised by Degussa A.G. in the form of an aqueous solution at 65% under the name QUAB 388).

A preferred quaternary amine compound is 2,3-epoxypropyl-N,N,N-trimethylammonium chloride.

A natural polymer or polymer of natural origin grafted with quaternary amine groups derived from a quaternary amine compound according to one of formula (1) or (2), for which one or more $R^1$, $R^2$ and $R^3$ groups is hydrogen, may then be converted into a compound for which one or more $R^1$, $R^2$ and $R^3$ groups is a hydrocarbon group from the N-alkylation reaction, for example, with a compound of formula $R^5$Hal where $R^5$ is a hydrocarbon group optionally substituted, for example by an alkyl, a hydroxyalkyl or an alkenyl and Hal is a halogen, more particularly fluorine, chlorine, bromine or iodine, to quaternise all the amine groups.

According to an example of an embodiment of a grafting operation by etherification, the process of production of the cationic polymer comprises an initial activation step of the hydroxyl functions of the polysaccharide according to the following reaction (A):

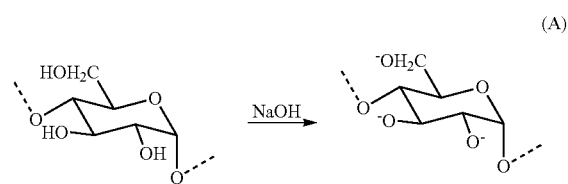

The first step is preferably carried out in a basic medium. Advantageously, it is carried out at ambient temperature in a neutral atmosphere.

Depending on the type of the amine compound, the process of production of the cationic polymer may comprise a second step corresponding to activation of the amine compound by formation of an epoxide according to the following reaction (B):

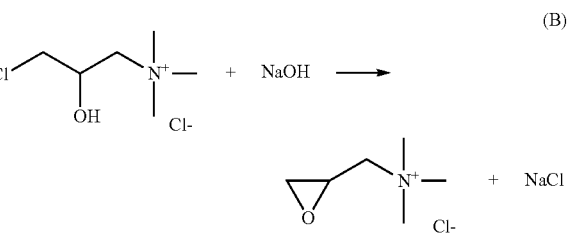

Advantageously, the second step is carried out at ambient temperature in a neutral atmosphere.

The process of production of the cationic polymer may comprise a third step corresponding to the following etherification reaction (C):

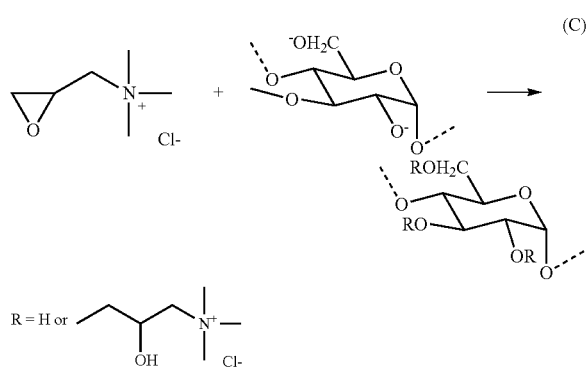

(C)

wherein

The third step may be carried out by adding in several additions, at ambient temperature and in a neutral atmosphere, the epoxide compound obtained in step (B) to the activated polysaccharide obtained in step (A). The temperature may then be increased to promote the reaction (C).

The third step may be followed by a fourth step of neutralisation which comprises the addition of a (mineral or organic) acid to the mixture from reaction (C). Preferably, the acid is acetic acid.

The fourth step may be followed by a fifth step of purification which may comprise precipitation of the cationic polymer in an alcohol medium, ultra filtration, dialysis or electro dialysis of the neutralised solution.

According to an example of an embodiment of the invention, in the case where the grafting operation of the quaternary amine groups on the natural polymer or polymer of natural origin comprises esterification reactions, the quaternary amine groups may be derived from a quaternary amine compound according to formula (5):

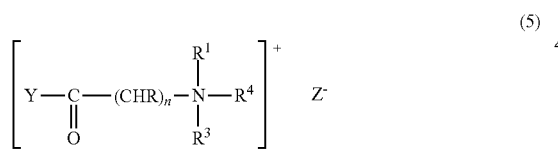

(5)

wherein Y is a halogen, in particular fluorine, chlorine, bromine or iodine, preferably chlorine, OH, or O$^-$;

n, Z, R, $R^1$, $R^3$ are as previously defined, $R^4$ may be hydrogen, an organic radical or a group according to formula (6):

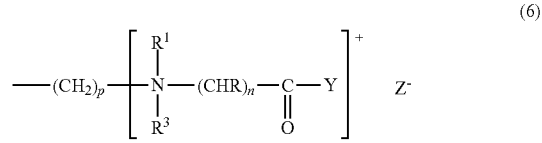

(6)

wherein p, R, $R^1$, $R^2$, $R^3$, Y and Z are as previously defined.

According to an example of an embodiment, the quaternary amine compound is selected from the group comprising:
- betaine (trimethylglycine);
- betainyl chloride; or
- betaine chloride.

According to an example of an embodiment of a grafting operation by esterification, the process of production of a cationic polysaccharide comprises an esterification reaction according to the following reaction (D):

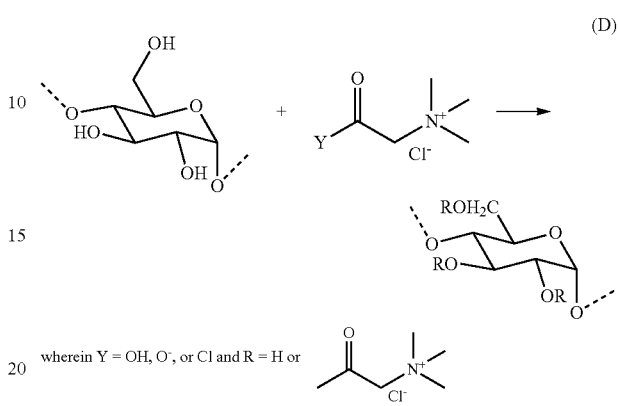

(D)

wherein Y = OH, O$^-$, or Cl and R = H or

Reaction (D) may be catalyzed by a chemical or enzymatic catalyst.

According to another example of a process of production of the cationic polymer, when the natural polymer or polymer of natural origin initially comprises amine groups, a quaternisation reaction may be carried out directly of all the amine groups of the natural polymer or polymer of natural origin. When the natural polymer or polymer of natural origin is a polysaccharide, this type of reaction may in particular be used when the polysaccharide is chitosan.

According to an example of an embodiment of a grafting operation of a polysaccharide by quaternisation, the process of production of the cationic polysaccharide comprises a quaternisation reaction according to the following reaction (E):

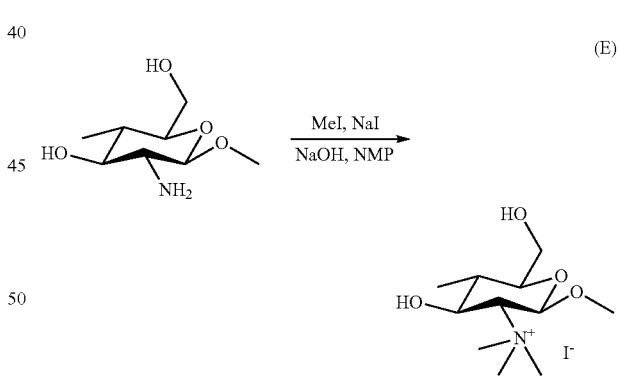

(E)

This reaction may be carried out by putting polyglucosamine (or a protein) in the presence of methyl iodide (MeI), sodium iodide (NaI) and sodium hydroxide in a solution of N-methylpyrrolidone (NMP).

According to another example of the process of production of the cationic polymer, re-dox reactions and amination-reduction reactions are carried out on the natural polymer or polymer of natural origin. According to an example of an embodiment of an operation of transformation of a polysaccharide by re-dox reactions and amination-reduction reactions, the process of production of the cationic polysaccharide comprises an initial re-dox reaction corresponding to the following reaction (F):

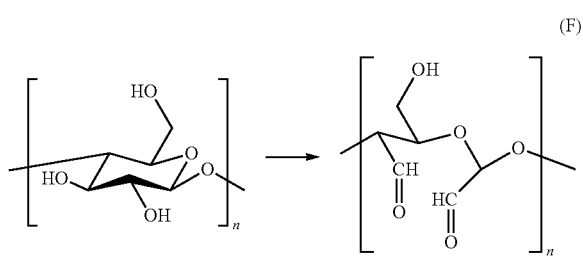

(F)

The process of production of the cationic polymer may comprise a second step corresponding to the following amination-reduction reaction (G):

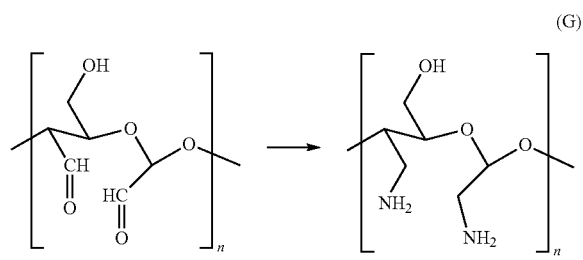

(G)

The process of production of the cationic polymer may comprise a third step corresponding to the following quaternisation reaction (H):

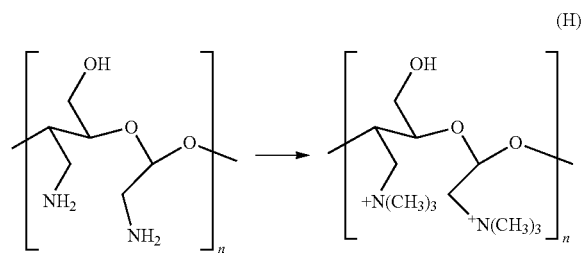

(H)

In the case where the cationic polymer according to the invention is associated with a halide ion, in particular the chloride ion, the examples of the process of production of the cationic polymer previously described may comprise an additional step of exchange of anions which consists of exchanging at least part of the chloride ions by less corrosive ions. By way of exchange, the cationic polymer according to the invention may, after ion-exchange treatment, be associated with at least 0.1% of halide ions.

Advantageously, the hydraulic composition for which the cationic polymer is used is a concrete or a mortar.

The cationic polymer according to the invention is particularly useful to neutralise the harmful effects of impurities contained in hydraulic compositions, in particular clays found in certain sands. It furthermore presents at least one of the following advantages:

It makes it possible to reduce the quantity of water or fluidizer (plasticizer or super plasticizer) required to obtain a given fluidity;
It is efficient for different clays;
It does not disturb the characteristics of the mortar in cases of over dosage;
It does not disturb the mechanical strengths of the hydraulic composition in the short term or in the long term;
It does not have a setting-retarding effect;
It is stable over time and is resistant to heat and freezing;
It involves the introduction of a reduced quantity of a halogen, for example chlorine, in the hydraulic composition.

The cationic polymer according to the invention is particularly useful to neutralise the harmful effects of impurities contained in hydrocarbon compositions. It furthermore has at least one of the following advantages:

It makes it possible to obtain a hydrocarbon composition having improved behaviour in water, that is to say that hydrocarbon binder/aggregates adhesion of a hydrocarbon composition according to the invention after immersion in water or exposure to humidity is better than the one of a hydrocarbon composition not comprising the cationic polymer according to the invention;
It makes it possible to upgrade non-conforming aggregates relative to the Standards pertaining to aggregates for hydrocarbon compositions (in particular see the XP P 18545 Standard chapters 7 and 8, and the NF EN 13043 Standard) and that it is consequently not possible to use. The process according to the invention makes it possible for example to use aggregates having a high methylene blue value, which is to say greater than 2 g, 2.5 g or 3 g of methylene blue per kilogramme of aggregates depending on the target application;
It has no negative influence on the usage properties of hydrocarbon compositions;
It avoids over-consumption of water compared to the washing operation of aggregates typically used.

The cationic polymers may be used according to the envisaged application, in the solid form (granule, beads), liquid or emulsion forms.

The described process is useful for impurities, in particular clays present in certain constituents of the given compositions. These impurities may affect the properties of the compositions.

The treatment of materials containing clays is particularly easy and rapid. The cationic polymer according to the invention has considerable affinity with the clays. Therefore, it suffices to put the cationic polymer in contact with the material to inert the clays contained in the materials. A few seconds of contact is generally sufficient.

Advantageously, the cationic polymer is contacted with the material by spraying an aqueous solution of the cationic polymer.

In the case of a particulate material, the material is mixed during or after treatment of the material with the cationic polymer in order to ensure good distribution of the cationic polymer and obtain a homogenously treated material.

Clays are a frequent source of impurities in sands. Therefore, according to an embodiment of the invention, the sand is treated with the cationic polymer.

Preferably, the sand is contacted with the cationic polymer by spraying the product in aqueous solution on the sand.

Preferably the sand is treated dry. Therefore the sand preferably has a humidity value less than 10% by weight. The treatment of the sand is preferably carried out at the quarry.

In order to ensure good distribution of the cationic polymer and obtain a homogenously treated sand, the sand is preferably mixed.

The spraying may be carried out in a container, for example in a baffle box at the output of a conveyor belt. This embodiment furthermore ensures little loss of the product.

As a variant, it may be envisaged spraying a solution of the cationic polymer in a mixer placed at the output of the conveyor belt. It may also be envisaged to prepare a pre-mix of a small quantity of sand with the product, then adding this pre-mix to the sand.

The cationic polymer is preferably applied on the sand in a suitable quantity to ensure that the clays present in the sand are completely inerted and to avoid an over dosage of superplasticizer.

Nevertheless, partial treatment may be envisaged and the application of a greater quantity does not deteriorate the target properties of the hydraulic composition. Therefore, it is not necessary to measure the quantity of clay in the sand beforehand to determine the necessary quantity of cationic polymer.

The quantity of cationic polymer required for inerting depends mainly on the content of clays in the sand. It may also vary according to the nature of the clays in the sand. For information purposes, treatment of sand is generally satisfactory with a dosage of 2 to 20%, preferably from 5 to 10% by weight of dry extract of cationic polymer relative to the weight of dry clay in the sand.

Preferably, the treatment of sand is generally satisfactory with a dosage of 300 ppm to 10,000 ppm, preferably 1,000 ppm to 3,000 ppm by dry mass of cationic polymer relative to the mass of sand.

The cationic polymer may be added to one or more of the constituents containing the harmful impurities. It may also be added at the time of the preparation of the hydraulic composition, for example in the mixing water.

The cationic polymer may therefore be added at the quarry as well as at the concrete mixing plant.

Direct treatment of the constituents, for example at a sand quarry, is generally more efficient and therefore is preferred.

The constituents thus treated may also be used in the typical manner, in particular for preparation of hydraulic-setting compositions. They are useful for preparation of hydraulic compositions having constant properties.

In particular, sands thus treated are useful for the preparation of hydraulic compositions, in which clays could disturb the efficiency of the superplasticizers. They may be used in the typical manner for preparation of hydraulic-setting compositions.

The hydraulic compositions comprising sands with a content of clay treated with the cationic polymer according to the invention have comparable rheological properties to those prepared with clay-free sands or those prepared with the cationic polymers described in patent application WO2006032785, without an over dosage of superplasticizer and, therefore at a lower cost.

This process therefore makes it possible to reduce the quantity of water or fluidizer required to obtain a desired fluidity.

Furthermore, advantageously the described process does not disturb the characteristics of the compositions, even in cases of over dosages. In particular, no air-entraining or retarded setting effects are observed. Furthermore, the use of the described process does not affect the other characteristics of hydraulic compositions, for example workability and its slump retention over time, short and long-term mechanical strengths or the setting time.

The described process makes it possible to even treat very polluted constituents. The described cationic polymer is indeed efficient at a low dosage, and therefore makes an industrial scale inerting treatment economically viable. Furthermore, the cationic polymer is stable over time and resists heat and freezing Finally, the process does not require installation of particular equipment.

The result is that the described process may be efficient for a broad range of conditions, for different types of hydraulic compositions and clays.

The invention will be described in more detail in the following examples provided for non-limiting purposes.

EXAMPLES

The present invention is illustrated by the following non-limiting examples. The materials used in the examples are available from the following suppliers:

| | |
|---|---|
| (1) Cement | Lafarge France, Le Havre. |
| (2) ISO sand | Nouvelle de Littoral, France |
| (3) Siliceous Fulchiron PE2 LS sand | Fulchiron, France |
| (4) Erbray Filler | MEAC, France |
| (5) Glenium 27 superplasticizer | Chryso, France |
| (6) FL-2250 cationic polymer | SNF, France |
| (7) C*Plus 08011 yellow dextrin or TACKIDEX ® C172Y white dextrin | Cargill Roquette Company |
| (8) QUAT188 | Dow Chemical Company |
| (9) Chitosan 652 | France Chitine |
| (10) Hydroxyethyl cellulose (Natrosol 250 LR) | Hercules |
| (11) GTMAC | Aldrich |

Determination of the Degree of Substitution of a Polymer which was Obtained with a Base of Dextrin by a Measurement of Total Nitrogen Determination of the degree of substitution, DS of a polymer by quaternary amine groups is carried out by determining the polymer's percentage of nitrogen by measurement of total nitrogen.

The measurement of nitrogen is carried out with a titrator of total organic carbon (TOC) with a nitrogen module (TON "Total Organic nitrogen"). It is possible to measure the totality of the nitrogen contained in a sample. After complete oxidation at 1050° C., the nitrogenized compounds release nitric oxide in stoichiometric quantities. This is transformed, by contact with ozone (generated by the apparatus) into nitrogen dioxide, an unstable compound, according to the following reaction (I):

$$NO + O_3 \rightarrow NO2^* + O_2 \quad (I)$$

The return to a stable state of the nitrogen dioxide takes place with the emission of photons (close to infrared), the emissions of light proportional to the concentration of nitric oxide according to the following reaction (J):

$$NO_2^* \rightarrow NO_2 + h\nu \quad (J)$$

The light emitted by chemiluminescence is then measured by a photomultiplier, then a signal is obtained which can be observed in the form of a peak.

After having quantified the nitrogen contained in the sample, it is possible to determine the degree of substitution, DS, by considering that when a group from a compound according to formula (1) is grafted to a repetition unit of a homopolymer, the mass of the obtained final product corresponds to the sum of masses of the repetition unit and the compound minus the mass of the Z element and of the mass of a hydrogen atom. This therefore gives the following relation (K):

$$M_{Cationic\ Polysaccharide} = M_{UNIT} + DS \times (M_{QUAT} - M_{HZ}) \quad (K)$$

wherein $M_{Cationic\ polysaccharide}$ is the molar mass of the cationic polysaccharide, $M_{UNIT}$ is the molar mass of the repetition unit of the polymer, $M_{QUAT}$ is the molar mass of the amine compound from which the amine group is obtained, $M_{HZ}$ is the molar mass of the HZ compound. Furthermore, by calling, $M_N$ the total mass of the nitrogen (14 g/mol) and $C_N$ the mass concentration (in %) of nitrogen in the total quantity of the cationic polysaccharide, one obtains:

$$C_N = \frac{M_N \times DS}{M_{Cationic\ Polysaccharide}} \quad (L)$$

Finally one obtains:

$$DS = \frac{M_{UNIT} \times C_N}{M_N - C_N(M_{QUAT} - M_{HZ})} \quad (M)$$

In the case where the amine compound is QUAT 188, that the Z is chlorine and that the polymer is dextrin, the relation (M) becomes:

$$DS = \frac{162 C_N}{14 - 152,5 \times C_N} \quad (N)$$

Determination of the Degree of Substitution of a Cationic Polymer which was Obtained with a Base of Chitosan by Measurement of the Chlorine The content of chlorine of the cationic polymers is determined by potentiometric measurements. The chlorides, present in solution, are precipitated by the addition of a solution of silver nitrate of a known volume, then the quantity of silver nitrate introduced in excess is measured by HCl (hydrochloric acid). The content of measured chlorine also makes it possible to determine the degree of substitution.

Method of Preparation of a Mortar

The mortar is made using a mixer of the Perrier type. The entire operation is carried out at 20° C. The method of preparation comprises the following steps:

Introduce the sands, with or without clay, in a mixing bowl;

At T=0 second: begin mixing at low speed (140 rpm) and simultaneously add the wetting water in 30 seconds, then continue to mix at low speed (140 rpm) until 60 seconds;

At T=1 minute: stop the mixing and leave to rest for 4 minutes;

At T=5 minutes (TO for the measurement method of the setting time): add the hydraulic binder;

At T=6 minutes: mix at low speed (140 rpm) for 1 minute;

At T=7 minutes: add the mixing water in 30 seconds (whilst mixing at low speed (140 rpm)); and At T=7 minutes and 30 seconds: mix at high speed (280 rpm) for 2 minutes.

Mortar Formulation

The following mortar formulation was used to carry out the tests.

TABLE 1

Mortar Formulation

| Component | Mass (g) |
|---|---|
| Cement | 480.4 |
| ISO sand | 1350 |
| Siliceous sand | 200.1 |
| Limestone filler | 354.1 |
| Clays | 30 |
| Glenium 27 superplasticizer | 0.81 |
| Total water, including | 326.7 |
| mixing water | 226.7 |
| sand wetting water | 100 |

The Water/Cement ratio was 0.68. The cement was a Portland cement of the CEM I 52.5 N type.

The ISO sand was a certified CEN EN 196-1 sand. This is a natural siliceous sand, with round grains, a content of silica at least equal to 98%. Its particle size composition was within the boundaries given in Table 2.

TABLE 2

Particle size composition of the ISO sand

| Dimensions of the square meshes (mm) | Cumulated oversize on the sieve (%) |
|---|---|
| 2.00 | 0 |
| 1.60 | 7 ± 5 |
| 1.00 | 33 ± 5 |
| 0.50 | 67 ± 5 |
| 0.16 | 87 ± 5 |
| 0.08 | 99 ± 1 |

The clay comprised one third of kaolinite, one third of illite and one third of montmorillonite. The quantity of clays corresponded to 1.95% by weight relative to the weight of the sands.

Method to Measure the Spread of a Hydraulic Composition

The principle of the spread measurement consists in filling a truncated spread measurement cone with the hydraulic composition to be tested, then releasing the said composition from the said truncated spread measurement cone in order to determine the surface of the obtained disk when the hydraulic composition has finished spreading. The truncated spread measurement cone corresponds to a reproduction at the scale ½ of the cone as defined by the NF P 18-451 Standard, 1981. The truncated spread measurement cone has the following dimensions:

top diameter: 50+/−0.5 mm;
bottom diameter: 100+/−0.5 mm; and
height: 150+/−0.5 mm.

The entire operation is carried out at 20° C. The spread measurement is carried out in the following manner:

Fill the reference cone in one single operation with the hydraulic composition to be tested;

If necessary, tap the hydraulic composition to homogenously distribute it in the truncated cone;

Level the top surface of the cone;

Lift the truncated cone vertically; and

Measure the spread according to four diameters at 45° with a calliper square. The result of the spread measurement is the average of the four values, +/−1 mm.

Method to Measure the Viscosity of a Hydraulic Composition

The viscosity measurement consists in measuring the flow time through a truncated viscosity measurement cone of a hydraulic composition to be tested. The truncated viscosity measurement cone has the following dimensions:
  larger diameter: 150 mm; and
  smaller diameter: 17 mm.

The truncated viscosity measurement cone further comprises first and second marks which may be parallel marks provided on the sides of the truncated cone and defining planes perpendicular to the axis of the truncated cone. The first mark is closer to the base of the larger diameter than the second mark. The distance between the two marks is 60 mm, the first mark being at 12 mm from the base with the larger diameter.

The entire operation is carried out at 20° C. The viscosity measurement of a hydraulic composition is carried out in the following manner:
  Orient the axis of the truncated cone vertically, the smaller diameter being oriented downwards and being obturated by a plug;
  Fill the truncated cone with the hydraulic composition up to above the first mark;
  Tap the hydraulic composition with a spatula in order to ensure the absence of big air bubbles;
  Remove the plug;
  Start the stopwatch when the level of hydraulic composition passes the first mark;
  Stop the stop watch when the level of hydraulic composition passes the second mark; and
  Record the time, which is representative of the viscosity of the hydraulic composition.

Method to Measure the Setting Start Time of a Mortar

The concrete mortar (150 g) is introduced in a plastic container placed in a semi-adiabatic enclosure. A temperature probe is then introduced into the concrete mortar to measure the evolution of the temperature. The curve of the evolution of the temperature measured as a function of the time is stored for 24 hours. This curve successively comprises an initial portion where the temperature changes, a second portion where the temperature increases, generally in a more or less linear manner and a third portion where the temperature drops. The beginning of the setting time corresponds to the moment at which there is an inflexion of the evolution curve between the initial and second portions.

The quantity of cationic polymer according to the invention introduced in the following examples is given in percentages by weight of polymer relative to the weight of the clays contained in the mortar.

REFERENCE EXAMPLE

A mortar M1 was prepared having the formulation previously described.

A mortar M2 was prepared having the formulation previously described the difference being that the M2 mortar did not comprise clays.

The product commercialised by SNF under the name of FL-2250 was used as the REF polymer. It is a polyamine coming from the condensation of epichlorohydrin and dimethylamine.

The REF polymer has a cationicity of 7.27 meq/g and 26% content of chlorine.

A MREF mortar was then prepared as previously indicated by adding, with the pre-wetting water, 10% by weight of the REF polymer relative to the weight of the clays.

The spread, viscosity and setting time were measured after preparing the M1, M2 and MREF mortars as previously described. The results are grouped together in Tables 3, 4 and 5 below.

TABLE 3

Measurement of the spread of mortar

| Mortar | Inerting agent (%) | Spread (mm) | | | | |
|--------|-----|---------|---------|---------|---------|---------|
|        |     | 5 mins  | 15 mins | 30 mins | 60 mins | 90 mins |
| M1     | 0   | 100     | 100     | 100     | 100     | 100     |
| M2     | 0   | 325     | 300     | 287     | 270     | —       |
| MREF   | 10  | 300     | 297     | 290     | 270     | 225     |

TABLE 4

Viscosity

| Mortar | Inerting agent (%) | Viscosity 5 mins. | Viscosity 30 mins. | Viscosity 60 mins. |
|--------|-----|----|----|----|
| M1     | 0   | —  | —  | —  |
| M2     | 0   | 17 | 30 | 50 |
| MREF   | 10  | 17 | 29 | 44 |

TABLE 5

Setting Time

| Mortar | Inerting agent (%) | Setting time (h/mins) |
|--------|-----|------------|
| M1     | 0   | 2 h 20 mins |
| M2     | 0   | 4 h 40 mins |
| MREF   | 10  | 4 h 40 mins |

The spread of the M1 mortar containing clays and not containing an inerting agent was smaller than the spread of the M2 mortar not containing clay. The viscosity of the M1 mortar was too significant and could not be measured. The setting time of the M1 mortar was shorter than the setting time of the M2 mortar.

The spread, viscosity and setting time of the reference MREF mortar containing the inerting agent were substantially of the same order as those of the M2 mortar not containing clay.

Examples 1 to 6

For Examples 1 to 6, the cationic polymers, Dext1 to Dext6, were prepared from yellow dextrin C*Plus 08011 as follows.

Yellow dextrin (33.8 g at 96% of dry extract, i.e. 0.2 mole of AGU) and a quantity $Q_{WATER}$ of water were introduced into a 1-liter double jacket reactor, at ambient temperature and mechanically stirred. When the dextrin was perfectly dissolved, an initial quantity of sodium hydroxide at 50% (48 g, i.e. 0.6 mole) was added, then the mix was mechanically stirred for one hour in a nitrogen atmosphere. Then, a quantity $Q_{QUAT188}$ of QUAT188 was gradually added, followed by the addition of a second quantity $Q_{NaOH}$ of sodium hydroxide at 50%, the addition being carried out in two additions every 20 minutes. Once this addition of sodium hydroxide was complete, the reaction mixture was heated to 70° and left in a nitrogen atmosphere for two hours, then cooled before being neutralized with adipic acid.

For Examples 1 to 4, the obtained product was ultra-filtered on a 5 kDa membrane of polyethersulfone for purification. Only the molecules with a molar mass greater than 5 kDa were kept.

For each cationic polymer Dext1 to Dext4, the quantities of $Q_{WATER}$, $Q_{QUAT188}$ and $Q_{NaOH}$, the mass yield, the degree of substitution (DS) of the obtained cationic groups by measurement of the nitrogen are given in Table 6 below:

TABLE 6

Cationic Dextrins at Different DS

| Reference | Dext1 | Dext2 | Dext3 | Dext4 |
|---|---|---|---|---|
| $Q_{WATER}$ (g) | 187 | 235 | 224 | 235 |
| $Q_{QUAT188}$ (g) | 62.67 | 125.3 | 188 | 250.7 |
| $Q_{NaOH}$ (g) | 16 | 32 | 48 | 64.2 |
| Mass yield of cationic dextrin (%) | 78 | 78 | 89 | 84 |
| Total content of nitrogen (%) | 1.9 | 2.3 | 3.5 | 4.3 |
| DS | 0.27 | 0.35 | 0.65 | 0.92 |
| Content of chlorine (%) | 2.3 | 3.6 | 7.0 | 9.8 |

The polymer Dext5 was obtained using the same process as the one previously described for the polymer Dext4 (DS: 0.92) the difference being that the purification step was carried out using a 10 kDa membrane of polyethersulfone. Only the molecules with a molar mass substantially greater than 10 kDa were kept.

The polymer Dext6 was obtained using the same process as the one previously described for the polymer Dext4 (DS: 0.92) the difference being that the purification step was carried out in two steps. In an initial step, a 10 kDa membrane of polyethersulfone was used. Only the molecules with a molar mass substantially lower than 10 kDa were kept. In a second step, a 5 kDa membrane of polyethersulfone was used. Only the molecules with a molar mass substantially greater than 5 kDa were kept. At the end of the two steps, only the molecules with a molar mass substantially between 5 kDa and 10 kDa were kept.

Example 1

A mortar MDext1 was prepared as previously described, but adding the Dext1 polymer (DS of 0.27) after the pre-wetting water in the quantities given in Tables 7 and 8 below.

The spread and the setting time were measured after preparation of the MDext1 and MREF mortars as previously described. The results are given in Tables 7 and 8 below.

TABLE 7

Measurement of the spread of mortar

| | | Spread (mm) | | | | | |
|---|---|---|---|---|---|---|---|
| Mortar | Dosage (% of clay) | 5 mins | 15 mins | 30 mins | 60 mins | 90 mins | 120 mins |
| MDext1 | 10 | 185 | 170 | 165 | 170 | 170 | 115 |
| | 20 | 185 | 210 | 215 | 205 | 205 | 195 |
| MREF | 10 | 300 | 297 | 290 | 270 | 225 | — |

TABLE 8

Setting Time

| | Dosage (% of clay) | Setting time (h/mins) |
|---|---|---|
| MDext1 | 10 | 7 h |
| MREF | 10 | 4 h 40 mins |

Example 2

A MDext2 mortar was prepared as previously described, but adding the Dext2 polymer (DS of 0.35) after the pre-wetting water, in the quantities given in Tables 9, 10 and 11 below.

The spread, viscosity and setting time were measured after preparation of the MDext2 and MREF mortars as previously described. The results are gathered together in Tables 9, 10 and 11 below.

TABLE 9

Measurement of the spread of mortar

| | | Spread (mm) | | | | | |
|---|---|---|---|---|---|---|---|
| Mortar | Dosage (% of clay) | 5 mins | 15 mins | 30 mins | 60 mins | 90 mins | 120 mins |
| MDext2 | 10 | 190 | 180 | 170 | — | — | — |
| | 15 | 190 | 210 | 200 | 195 | — | — |
| | 20 | 300 | 340 | 350 | 340 | 330 | 310 |
| | 30 | 410 | 410 | 405 | 395 | — | — |
| MREF | 10 | 300 | 297 | 290 | 270 | 225 | — |

TABLE 10

Viscosity

| Mortar | Dosage (% of clay) | Viscosity 5 mins | Viscosity 15 mins | Viscosity 30 mins | Viscosity 60 mins |
|---|---|---|---|---|---|
| MDext2 | 10 | >50 | >50 | >50 | >50 |
| | 15 | >50 | >50 | >50 | >50 |
| | 20 | 29 | 31 | — | 45 |
| | 30 | — | — | — | — |
| MREF | 10 | 17 | — | 29 | 44 |

TABLE 11

Setting Time

| Mortar | Dosage (% of clay) | Setting time (h/mins) |
|---|---|---|
| MDext2 | 10 | 5 h 15 mins |
| | 20 | 38 h |
| MREF | 10 | 4 h 40 mins |

A 20% dosage of cationic polymer, calculated by weight of dry polymer relative to the weight of clay, made it possible to reach a bigger spread than the spread of the reference MREF mortar.

Example 3

A MDext3 mortar was prepared as previously described, but adding the Dext3 polymer (DS of 0.65) after the pre-wetting water in the quantities given in Tables 12, 13 and 14 hereinafter.

The spread, viscosity and setting time were measured after preparation of the mortars as previously described. The results are gathered together in Tables 12, 13 and 14 below.

TABLE 12

Measurement of the spread of mortar

| Mortar | Dosage (% of clay) | Spread (mm) | | | | | |
|---|---|---|---|---|---|---|---|
| | | 5 mins | 15 mins | 30 mins | 60 mins | 90 mins | 120 mins |
| MDext3 | 10 | 250 | 255 | 240 | 220 | 190 | 180 |
| | 12 | 320 | 335 | 325 | 300 | 280 | 255 |
| | 15 | 400 | 410 | 405 | 400 | 385 | — |
| MREF | 10 | 300 | 297 | 290 | 270 | 225 | — |

TABLE 13

Viscosity

| Mortar | Dosage (% of clay) | Viscosity 5 mins | Viscosity 15 mins | Viscosity 30 mins | Viscosity 60 mins |
|---|---|---|---|---|---|
| MDext3 | 10 | 37 | — | — | — |
| | 12 | 20 | 27 | — | 46 |
| | 15 | 19 | 27 | — | — |
| MREF | 10 | 17 | — | 29 | 44 |

TABLE 14

Setting Time

| | Dosage (% of clay) | Setting time (h/mins) |
|---|---|---|
| MDext3 | 10 | 6 h 10 mins |
| | 12 | 7 h 30 mins |
| | 15 | 11 h 08 mins |
| MREF | 10 | 4 h 40 mins |

A 12% dosage of cationic polymer, calculated by weight of dry polymer relative to the weight of clay, made it possible to reach a bigger spread than the spread of the reference MREF mortar.

Example 4

A MDext4 mortar was prepared as previously described, but adding the Dext4 polymer (DS of 0.92) after the pre-wetting water in the quantities given in Tables 15, 16 and 17 hereinafter.

The spread, viscosity and setting time were measured after preparation of the MDext4 and MREF mortars as previously described. The results are gathered together in Tables 15, 16 and 17 below.

TABLE 15

Measurement of the spread of mortar

| Mortar | Dosage (% of clay) | Spread (mm) | | | | | |
|---|---|---|---|---|---|---|---|
| | | 5 mins | 15 mins | 30 mins | 60 mins | 90 mins | 120 mins |
| MDext4 | 8 | 280 | 265 | 255 | 220 | 200 | 175 |
| | 9 | 320 | 315 | 305 | 275 | 255 | 220 |
| | 10 | 350 | 355 | 340 | 300 | 280 | 240 |
| MREF | 10 | 300 | 297 | 290 | 270 | 225 | — |

TABLE 16

Viscosity

| Mortar | Dosage (% of clay) | Viscosity 5 mins | Viscosity 15 mins | Viscosity 30 mins | Viscosity 60 mins |
|---|---|---|---|---|---|
| MDext4 | 8 | 24 | 46 | — | — |
| | 9 | 16 | 23 | — | 48 |
| | 10 | 18 | 26 | — | 54 |
| MREF | 10 | 17 | — | 29 | 44 |

TABLE 17

Setting Time

| Mortar | Dosage (% of clay) | Setting time (h/mins) |
|---|---|---|
| MDext4 | 8 | 5 h |
| | 10 | 5 h 20 mins |
| MREF | 10 | 4 h 40 mins |

A 9% dosage of cationic polymer, calculated by weight of dry polymer relative to the weight of clay, made it possible to reach a bigger spread than the spread of the reference MREF mortar.

Examples 1 to 4 show that the lower the degree of substitution of the polymer with a base of dextrin, the greater the quantity of polymer to be introduced in the mortar to obtain a similar spread to the spread of the reference MREF mortar.

Example 5

A MDext5 mortar was then prepared as previously described, but adding the Dext5 polymer (DS of 0.92 and molecular mass greater than 10 kDa) after the pre-wetting water in the quantities given in Tables 18, 19 and 20 hereinafter.

The spread, viscosity and setting time were measured after preparation of the MDext5 and MREF mortars as previously described. The results are gathered together in Tables 18, 19 and 20 below.

TABLE 18

Measurement of the spread of mortar

| Mortar | Dosage (% of clay) | Spread (mm) | | | | | |
|---|---|---|---|---|---|---|---|
| | | 5 mins | 15 mins | 30 mins | 60 mins | 90 mins | 120 mins |
| MDext5 | 8 | 275 | 265 | 250 | 230 | 220 | 185 |
| | 10 | 390 | 392 | 380 | 350 | 320 | 285 |
| MREF | 10 | 300 | 297 | 290 | 270 | 225 | — |

TABLE 19

Viscosity

| Mortar | Dosage (% of clay) | Viscosity 5 mins | Viscosity 30 mins | Viscosity 60 mins | Viscosity 90 mins |
|---|---|---|---|---|---|
| MDext5 | 8 | 27 | 58 | — | — |
| | 10 | 17 | 22 | — | 36 |
| MREF | 10 | 17 | 29 | 44 | — |

TABLE 20

Setting Time

| Mortar | Dosage (% of clay) | Setting time (h/mins) |
|---|---|---|
| MDext5 | 10 | 7 h 30 mins |
| MREF | 10 | 4 h 40 mins |

At low dosages of the cationic polymer, 8% or 10%, calculated by weight of dry polymer relative to the weight of clay, a spread close to the spread of the reference MREF mortar can be obtained.

Example 6

A MDext6 mortar was then prepared as previously described, but adding the Dext6 polymer (DS of 0.92 and molecular mass of from 5 kDa to 10 kDa) after the pre-wetting water in the quantities given in Tables 21, 22 and 23 hereinafter.

The spread, viscosity and setting time were measured after preparation of the MDext6 and MREF mortars as previously described. The results are gathered together in Tables 21, 22 and 23 below.

TABLE 21

Measurement of the spread of mortar

| Mortar | Dosage (% of clay) | Spread (mm) | | | | | |
|---|---|---|---|---|---|---|---|
| | | 5 mins | 15 mins | 30 mins | 60 mins | 90 mins | 120 mins |
| MDext6 | 10 | 315 | 330 | 315 | 305 | 285 | 255 |
| MREF | 10 | 300 | 297 | 290 | 270 | 225 | — |

TABLE 22

Viscosity

| Mortar | Dosage (% of clay) | Viscosity 5 mins | Viscosity 30 mins | Viscosity 60 mins | Viscosity 90 mins |
|---|---|---|---|---|---|
| MDext6 | 10 | 19 | 26 | | 40 |
| MREF | 10 | 17 | 29 | 44 | — |

TABLE 23

Setting Time

| Mortar | Dosage (% of clay) | Setting time (h/mins) |
|---|---|---|
| MDext6 | 10 | 6 h 15 mins |
| MREF | 10 | 4 h 40 mins |

Examples 7 to 9

For Examples 7 to 9, the Chit1 to Chit3 cationic polymers were prepared as follows from chitosan.

A quantity $Q_{CHIT}$ of chitosan, a quantity $Q_{WATER}$ of water and a quantity $Q_{QUAT188}$ at 65% of QUAT188 were introduced into a 1-liter double-jacket reactor, at ambient temperature and mechanically stirred. When the chitosan was perfectly dispersed, a quantity $Q_{NaOH}$ of sodium hydroxide at 50% (12 g i.e. 0.15 mole) was added, then the mix was mechanically stirred for one hour in a nitrogen atmosphere. The obtained product was ultra-filtered on a 0.5 kDa membrane of polyethersulfone for purification. Only the molecules with a molar mass greater than 5 kDa were kept.

For each of the cationic polymers, Chit1 to Chit3, the quantities $Q_{CHIT}$, $Q_{WATER}$, $Q_{QUAT188}$ and $Q_{NaOH}$, the mass yield, the degree of substitution (DS) of the cationic groups obtained by measurement of the chlorine are given in Table 24 below:

TABLE 24

| | Chit1 | Chit2 | Chit3 |
|---|---|---|---|
| $Q_{CHIT}$ (g) | 30 | 10 | 15 |
| $Q_{WATER}$ (g) | 25 | 235 | 150 |
| $Q_{QUAT188}$ (g) | 43.9 | 40.2 | 0 |
| $Q_{QUAT151}$ (g) | 0 | 0 | 50 |
| $Q_{NaOH}$ (g) | 12 | 22.6 | 0 |
| DS | 0.65 | 0.59 | 1.35 |
| Mass yield (%) | 50 | 50 | 52 |

Example 7

A MChit1 mortar was prepared as previously described, but adding the Chit1 (DS of 0.65) polymer in the pre-wetting water in the quantities given in Tables 25, 26 and 27 hereinafter.

The spread, viscosity and setting time were measured after preparation of the MChit1 and MREF mortars as previously described. The results are gathered together in Tables 25, 26 and 27 below.

TABLE 25

Measurement of the spread of mortar

| Mortar | Dosage (% of clay) | Spread (mm) | | | | | |
|---|---|---|---|---|---|---|---|
| | | 5 mins | 15 mins | 30 mins | 60 mins | 90 mins | 120 mins |
| MChit1 | 6 | 315 | 275 | 250 | 200 | | |
| | 8 | 330 | 305 | 290 | 250 | 225 | 175 |
| | 10 | 340 | 315 | 295 | 260 | 235 | 185 |
| MREF | 10 | 300 | 297 | 290 | 270 | 225 | — |

TABLE 26

Viscosity

| Mortar | Dosage (% of clay) | Viscosity 5 min |
|---|---|---|
| MChit1 | 6 | 33 |
| | 8 | 30 |
| | 10 | 34 |
| MREF | 10 | 17 |

TABLE 27

Setting Time

| Mortar | Inerting agent (%) | Setting time (h/mins) |
|---|---|---|
| MChit1 | 6 | 4 h |
| | 8 | 4 h |
| | 10 | 4 h 30 mins |
| MREF | 10 | 4 h 40 mins |

Example 8

A MChit2 mortar was prepared as previously described, but adding the Chit2 polymer (DS of 0.59) in the pre-wetting water in the quantities given in Tables 28, 29 and 30 hereinafter.

The spread, viscosity and setting time were measured after preparation of the MChit2 and MREF mortars as previously described. The results are gathered together in Tables 28, 29 and 30 below.

TABLE 28

Measurement of the spread of mortar

| Mortar | Dosage (% of clay) | Spread (mm) | | | | |
|---|---|---|---|---|---|---|
| | | 5 mins | 15 mins | 30 mins | 60 mins | 90 mins |
| MChit2 | 10 | 360 | 335 | 325 | 300 | 260 |
| MREF | 10 | 300 | 297 | 290 | 270 | 225 |

TABLE 29

Viscosity

| Mortar | Dosage (% of clay) | Viscosity 5 mins | Viscosity 30 mins |
|---|---|---|---|
| MChit2 | 10 | 32 | 48 |
| MREF | 10 | 17 | 29 |

TABLE 30

Setting Time

| Mortar | Inerting agent (%) | Setting time (h/mins) |
|---|---|---|
| MChit2 | 10 | 4 h 30 mins |
| MREF | 10 | 4 h 40 mins |

Example 9

A Mchit3 mortar was then prepared as previously described, but adding the Chit3 polymer (DS of 1.35) in the pre-wetting water in the quantities given in Tables 31, 32 and 33 hereinafter.

The spread, viscosity and setting time were measured after preparation of the MREF and MChit3 mortars as previously described. The results are gathered together in Tables 31, 32 and 33 below.

TABLE 31

Measurement of the spread of mortar

| Mortar | Dosage (% of clay) | Spread (mm) | | | | |
|---|---|---|---|---|---|---|
| | | 5 mins | 15 mins | 30 mins | 60 mins | 90 mins |
| MChit3 | 10 | 330 | 335 | 295 | 255 | 225 |
| MREF | 10 | 300 | 297 | 290 | 270 | 225 |

TABLE 32

Viscosity

| Mortar | Dosage (% of clay) | Viscosity 5 mins | Viscosity 30 mins |
|---|---|---|---|
| MChit3 | 10 | 30 | 56 |
| MREF | 10 | 17 | 29 |

TABLE 33

Setting Time

| Mortar | Inerting agent (%) | Setting time (h/mins) |
|---|---|---|
| MChit3 | 10 | 4 h 30 mins |
| MREF | 10 | 4 h 40 mins |

Example 10

A cationic polymer, called Dext7, was prepared from dextrin as follows. To a solution of yellow dextrin, C*Plus 08011 (17 g i.e. 106 mmol), solubilised in an aqueous solution, 0.8 M NaOH (132.5 mL), in a nitrogen atmosphere at 45° C. for 30 minutes, a solution of GTMAC (Glycidyl-TriMethylAmmonium Chloride) (71.1 mL i.e. 371 mmol), solubilised beforehand in 18 mL of distilled water was added. The reaction was stirred for a total of 20 hours at 45° C. in a nitrogen atmosphere. The solution, after having been brought back to ambient temperature, was neutralised with a solution of HCl, then diluted with an aqueous solution 0.5 M NaCl until reaching a total volume of one liter. It was then ultra-filtered by tangential ultra filtration using a MILLI-PORE membrane (cut-off threshold 1000 g/mol), commercialised by Millipore, of polyethersulfone. The ultra filtration was stopped when the conductivity of the filtrate was stable and reached a value less than 10 μS. The solution was then lyophilized.

The yield of this reaction was 45%. The degree of substitution of the cationic groups by potentiometric measurement was 0.85.

Example 11

A cationic polymer, called Chit4 was prepared from chitosan as follows. To a solution of chitosan (15 g i.e. 87.2 mmol), dispersed in distilled water (150 mL) for one night at ambient temperature, GTMAC (GlycidylTriMethylAmmonium Chloride) was added drop by drop under stirring (165.5 mL i.e. 863 mmol being given that it is an aqueous solution at approximately 30%) in three additions with 2-hour intervals between each addition (58, 58 and 49.5 mL). The reaction was stirred for a total of 10 hours at 85° C. After cooling to ambient temperature, the reaction medium was diluted with water until reaching a total volume of one liter. It was then ultra-filtered by tangential ultra filtration using a MILLIPORE membrane (cut-off threshold 1000 g/mol) of polyethersulfone. The ultra filtration was stopped when the conductivity of the filtrate was stable and reached a value less than 10 μS. The solution was then lyophilized. The compound (20.25 g i.e. 45.4 mmol) was thus isolated. The yield of this reaction was 52.1%. The degree of substitution of the cationic groups by potentiometric measurement was 1.35.

Example 12 for Comparison

A cationic polymer, called Hec1, was prepared from hydroxyethyl cellulose as follows. To a solution of hydroxyethyl cellulose (17 g i.e. 31 mmol), solubilised in an aqueous solution, 0.8 M NaOH (132.5 mL) in a nitrogen atmosphere at 45° C. for 30 minutes, a solution of GTMAC (Glycidyl-TriMethylAmmonium Chloride) 51 mL i.e. 21.8 mmol), solubilised beforehand in 18 mL of distilled water, was added. The reaction was stirred for a total of 20 hours at 45° C. in a nitrogen atmosphere. The solution, after having been brought back to ambient temperature, was neutralised with a solution of HCl then diluted with an aqueous solution, 0.5 M NaCl, until reaching a total volume of one liter. It was then ultra-filtered by tangential ultra filtration using a MILLIPORE membrane (cut-off threshold 1000 g/mol) of polyethersulfone. The ultra filtration was stopped when the conductivity of the filtrate was stable and reached a value less than 10 µS. The solution was then lyophilized.

The yield of this reaction was 46%. The degree of substitution of the cationic groups by potentiometric measurement was 1.1.

A MHec1 mortar was prepared as previously described, but adding 10% by mass dry extract of the Hec1 polymer after the pre-wetting water.

The spread, viscosity and setting time were measured after preparation of the MREF and MHec1 mortars as previously described. The results are gathered together in Tables 34, 35 and 36 below.

TABLE 34

Measurement of the spread of mortar

| Mortar | Dosage (% of clay) | Spread (mm) | | | | | |
|---|---|---|---|---|---|---|---|
| | | 5 mins | 15 mins | 30 mins | 60 mins | 90 mins | 120 mins |
| MHec1 | 10 | 340 | 300 | 275 | 235 | 200 | — |
| MREF | 10 | 300 | 297 | 290 | 270 | 225 | — |

TABLE 35

Viscosity

| Mortar | Dosage (% of clay) | Viscosity 5 min |
|---|---|---|
| MHec1 | 10 | 45 |
| MREF | 10 | 17 |

TABLE 36

Setting Time

| | Dosage (% of clay) | Setting time (h/mins) |
|---|---|---|
| MHec1 | 10 | 4 h 10 mins |
| MREF | 10 | 4 h 40 mins |

The use of the Hec1 cationic polymer resulted in high initial viscosities. Furthermore, the spread at 90 minutes was insufficient.

Example 13

A cationic polymer was prepared according to a process using a quaternisation reaction. 40 g of chitosan were placed in a 2-liter Erlenmeyer flask and 120 mL of formic acid then 160 mL of an aqueous solution of formaldehyde at 30% and finally 720 mL of distilled water were added, bringing the total volume of the reaction medium to one liter. The solution was then heated at 70° C. with magnetic stirring for 5 days. The solution was then concentrated under vacuum and the pH was brought to 12 with a solution of NaOH (1 M). At this pH, a gel formed. It was then filtered on a frit and copiously washed in distilled water. The dimethyl chitosan (DMC) was then solubilised in water with a pH equal to 4 (adjusted with a solution of HCl at 1 M), filtered on a frit, then purified by ultra filtration (Pall Minimate TFF system with an Omega membrane 5000 Dalton). The product was finally lyophilised. The DMC was then quaternised with methyl iodide. To avoid O-methylation, the reaction was carried out in a mix of $H_2O$/DMF. More particularly, 20 g of DMC was placed in a 2-liter Erlenmeyer flask, then 500 mL of a mix of $H_2O$/DMF (50/50) was added. The assembly was magnetically stirred. A solution of NaOH (4 M) was then added until the formation of a gel, then 12 mL of $CH_3I$ was added. The reaction medium was then vigorously stirred for 48 hours at ambient temperature. At the end of the reaction, it was concentrated under vacuum and the trimethyl chitosan (TMC) was precipitated by three volumes of cold ethanol, then filtered on a frit. Solubilised in water it was precipitated a second time with ethanol. The obtained product was then solubilised in a solution of NaCl at 5% to carry out the ion exchange, then it was precipitated again with 3 volumes of ethanol. The TMC was finally purified by ultra filtration (Pall Minimate TFF system with an Omega membrane 5000 Dalton), then lyophilised. The $NMR^1H$ analysis gave a quaternisation percentage of 22%.

Example 14

A cationic polymer was prepared according to a process using re-dox and amination-reduction reactions.

15 g of cellulose (92.5 mol) was dissolved in 750 mL of distilled water. 39.59 g of sodium periodate (185 mmol) was added in 300 mL of distilled water and 50 mL of propanol. Mixing was carried out by magnetic stirring for 100 hours sheltered from light. It was then filtered on a Büchner funnel, the residue was washed with distilled water. The last washing was carried out with ethanol to facilitate the drying of the cellulose, after filtration, the cellulose was dried in a drying oven. 12 g of oxidised cellulose was obtained.

10 g of oxidised cellulose was put into suspension in water. An excess of sodium borohydride was added and the reaction was left to continue for 48 hours at ambient temperature. The reduced cellulose being soluble in water, it was purified by dialysis and evaporated to dryness. 8.15 g of reduced cellulose was obtained, i.e. 80% yield.

20 g of carboxymethyl cellulose (CMC) was dissolved in 700 mL of distilled water. 200 mL of an aqueous solution containing 30.06 g of sodium periodate (140 mmol) and 50 mL of propanol were added. It was then magnetically stirred for 25 hours. At the end of the reaction the solution was concentrated and filtered under vacuum. The residue was left to dry at ambient temperature. 15 g of oxidised CMC was obtained.

10 g of oxidised CMC was dissolved in 400 mL of distilled water by magnetic stirring. Then an aqueous solution containing 5.04 g of sodium cyanoborohydride and 3.6 mL of methylamine was added. The mix was magnetically stirred for 24 hours. It was concentrated and filtered under vacuum. It was washed with dimethyl acetamide and filtered again. The yield of this reaction was 67.4%.

10 g of aminated CMC (4 mmol) was dissolved in a mix of 300 mL of DMSO (DiMethyl Sulfoxide) and 300 mL of water. Six methyl iodide equivalents (24 mmol) were added and magnetically stirred for 4 days. After the reaction finished, it was filtered on a Büchner funnel, washed with ethanol and dried. 8 g of the product was obtained, that is to say, a yield of 80%. A quaternary ammonium group of the aminated CMC was formed.

Example 15

A Dext8 cationic polymer was prepared from TACKI-DEX® C172Y yellow dextrin as follows. Yellow dextrin (50.3 g at 96% of dry extract, i.e. 0.3 mole of AGU) and a quantity of sodium hydroxide at 15% (79.5 g i.e. 0.3 moles) were introduced into a 1-liter double jacket reactor at ambient temperature and mechanically stirred for 15 hours. The medium was heated to 45° C. A quantity $Q_{QUAT188}$ of QUAT188 was then gradually added followed by the gradual addition of sodium hydroxide at 15%, the addition carried out in 5 hours. Once this addition was finished, the reaction mixture was cooled before being neutralised with hydrochloric acid at 37%.

The obtained product was then ultra filtered on a 5 kDa membrane of polyethersulfone for purification. Only the molecules with a molar mass greater than 5 kDa were kept. The yield of this reaction was 75%. The degree of substitution of the cationic groups by measurement of the content of nitrogen was 0.8.

A MDext8 mortar was prepared as previously described, but adding 10% by mass of dry extract of the Dext8 polymer after the pre-wetting water. The spread, viscosity and setting time were measured after preparation of the MREF and MDext8 mortars as previously described. The results are gathered together in Tables 34, 35 and 36 below.

TABLE 37

Measurement of the spread of mortar

| Mortar | Dosage (% of clay) | Spread (mm) | | | | | |
|---|---|---|---|---|---|---|---|
| | | 5 mins | 15 mins | 30 mins | 60 mins | 90 mins | 120 mins |
| MDext8 | 10 | 350 | 350 | 350 | 325 | 305 | 265 |
| MREF | 10 | 300 | 297 | 290 | 270 | 225 | — |

TABLE 38

Viscosity

| Mortar | Dosage (% of clay) | Viscosity 5 mins |
|---|---|---|
| MDext8 | 10 | 16 |
| MREF | 10 | 17 |

TABLE 39

Setting Time

| | Dosage (% of clay) | Setting time (h/mins) |
|---|---|---|
| MDext8 | 10 | 5 h 15 mins |
| MREF | 10 | 4 h 40 mins |

The use of the Dext8 cationic polymer resulted in low initial viscosities and a high spread until 120 minutes.

Example 16

Starch was used as a cationic polymer, commercialised under the name of Hi Cat 985 580T624 by the Roquette company.

A solution of cationic starch was prepared from the Am1 cationic polymer and water. The measured dry extract was 9%.

A MAm1 mortar was prepared as previously described, but adding 10% by mass of dry extract of the cationic starch in solution with the pre-wetting water.

The spread, viscosity and setting time were measured after preparation of the MREF and MAm1 mortars as previously described. The results are gathered together in Tables 40 and 41 below.

TABLE 40

Measurement of the spread of mortar

| Mortar | Dosage (% of clay) | Spread (mm) | | | | | |
|---|---|---|---|---|---|---|---|
| | | 5 mins | 15 mins | 30 mins | 60 mins | 90 mins | 120 mins |
| MAm1 | 10 | 100 | — | — | — | — | — |
| MREF | 10 | 300 | 297 | 290 | 270 | 225 | — |

TABLE 41

Setting Time

| | Dosage (% of clay) | Setting time (h/mins) |
|---|---|---|
| MAm1 | 10 | 3 h 30 mins |
| MREF | 10 | 4 h 40 mins |

The use of the Am1 cationic starch resulted in a spread which was too small to be handled. This cationic polymer has a very high molecular weight (higher than 1,000,000 g/mol) and is not soluble in water at the temperature of the mortar.

The invention claimed is:

1. A process for preparation of an inerted hydraulic or hydrocarbon composition, comprising:
    a) providing aggregates comprising impurities and a hydraulic or hydrocarbon binder to prepare a hydraulic or hydrocarbon composition, and
    b) adding a cationic polymer to the composition or to one of its constituents, the cationic polymer corresponding to at least one derivative of dextrin, chitosan or chitin.

2. The process according to claim 1, wherein the cationic polymer is cationic dextrin.

3. The process according to claim 2, wherein the cationic polymer is yellow cationic dextrin.

4. The process according to claim 1, wherein the cationic polymer is substituted by quaternary amine groups.

5. The process according to claim 4, wherein the quaternary amine groups are derived from a quaternary amine compound according to formulae (1) or (2):

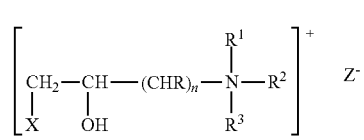

(1)

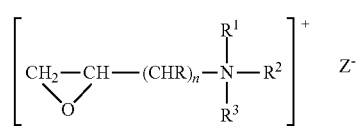

(2)

wherein n is an integer from 1 to 16;
X is a halogen;
Z is an inorganic or organic anion;
R, $R^1$, $R^2$ and $R^3$, which may be identical or different, are each hydrogen or an organic radical, $R^2$ furthermore capable of being a group according to formulae (3) or (4):

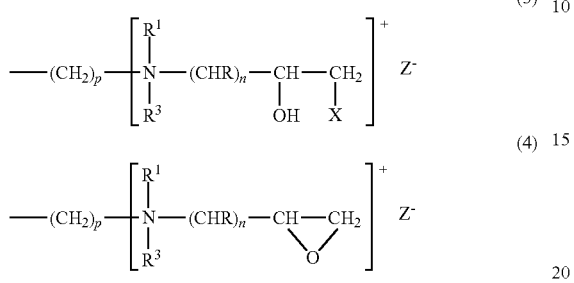

wherein p is an integer from 2 to 10 and n, R, $R^1$, $R^2$, $R^3$, X and Z are as previously defined.

6. The process according to claim 5, wherein R, $R^1$, $R^2$ and $R^3$ are each hydrogen or an alkyl, hydroxyalkyl, alkenyl or aryl group comprising up to 10 carbon atoms.

7. The process according to claim 5, wherein R, $R^1$, $R^2$ and $R^3$ are each hydrogen.

8. The process according to claim 6, wherein the quaternary amine compound is selected from the group consisting of:
2,3-epoxypropyl-N,N,N-trimethylammonium chloride;
3-chloro-2-hydroxypropyl-N,N,N-trimethylammonium chloride;
3-chloro-2-hydroxypropyl-N,N-dimethylethanolammonium chloride; and
1,3-bis-(3-chloro-2-hydroxypropyl-N,N-diméthylammonium)N-propane dichlorohydrin.

9. The process according to claim 5, wherein the quaternary amine compound is selected from the group consisting of betaine, betainyl chloride and betaine chloride.

10. The process according to claim 1, wherein the cationic polymer has a degree of substitution of from 0.2 to 2.5.

11. The process according to claim 1, wherein the hydraulic composition is a concrete or a mortar.

12. The process according to claim 1, wherein the cationic polymer is added to a sand of the aggregates.

13. The process according to claim 1, wherein the cationic polymer is added to a mixing water when preparing the hydraulic composition.

14. The process according to claim 1, wherein the impurities are clays.

15. A process for preparation of an inerted hydraulic or hydrocarbon composition, comprising:
a) providing sand comprising impurities;
b) adding a cationic polymer to the sand of step a), the cationic polymer corresponding to at least one derivative of dextrin, chitosan or chitin, and
c) mixing the inerted sand obtained after step b) and a hydraulic or hydrocarbon binder to prepare the inerted hydraulic or hydrocarbon composition.

16. The process according to claim 15, wherein the sand is contacted with the cationic polymer by spraying the cationic polymer in aqueous solution on the sand.

17. The process according to claim 15, wherein the sand has a humidity value less than 10% by weight.

18. The process according to claim 15, wherein the sand is treated with a dosage of 300 ppm to 10000 ppm by dry mass of cationic polymer relative to a mass of sand.

19. The process according to claim 15, wherein the impurities are clays.

20. A process for preparation of an inerted hydraulic composition, comprising:
a) providing aggregate comprising impurities;
b) providing a hydraulic binder;
c) adding a cationic polymer to mixing water, the cationic polymer corresponding to at least one derivative of dextrin, chitosan or chitin, and
d) mixing the aggregates, hydraulic binder and mixing water to prepare the inerted hydraulic composition.

21. The process according to claim 1, wherein the polymer is added at a quarry or at a concrete mixing plant.

22. The process according to claim 12, wherein the cationic polymer is added by spraying an aqueous solution.

* * * * *